United States Patent
Söhnchen et al.

(10) Patent No.: US 12,311,871 B2
(45) Date of Patent: May 27, 2025

(54) BELT RETRACTOR

(71) Applicant: AUTOLIV DEVELOPMENT AB, Vargarda (SE)

(72) Inventors: Arndt Söhnchen, Hamburg (DE); Ronald Jabusch, Elmshorn (DE); Antto-Christian Glaesser, Hasloh (DE); Alexandru Cirstea, Elmshorn (DE); Jens Ehlers, Horst (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/044,151

(22) PCT Filed: Aug. 30, 2021

(86) PCT No.: PCT/EP2021/073824
§ 371 (c)(1),
(2) Date: Mar. 6, 2023

(87) PCT Pub. No.: WO2022/049013
PCT Pub. Date: Mar. 10, 2022

(65) Prior Publication Data
US 2023/0322182 A1 Oct. 12, 2023

(30) Foreign Application Priority Data
Sep. 7, 2020 (DE) .................. 10 2020 211 208.8

(51) Int. Cl.
*B60R 22/405* (2006.01)
*B60R 22/46* (2006.01)

(52) U.S. Cl.
CPC ............ *B60R 22/46* (2013.01); *B60R 22/405* (2013.01); *B60R 2022/4666* (2013.01)

(58) Field of Classification Search
CPC ....... B60R 22/34; B60R 22/36; B60R 22/405; B60R 22/46; B60R 2022/4666
(Continued)

(56) References Cited

U.S. PATENT DOCUMENTS

| 6,439,494 B1 | 8/2002 | Specht et al. |
| 6,682,009 B1 * | 1/2004 | Frank .................. B60R 22/3413 242/379.1 |

(Continued)

FOREIGN PATENT DOCUMENTS

| DE | 19959956 A1 | 6/2001 |
| DE | 19927731 C2 | 10/2002 |

(Continued)

OTHER PUBLICATIONS

Description Translation for WO 2021/105159 from Espacenet (Year: 2021).*

*Primary Examiner* — Jason D Shanske
*Assistant Examiner* — Daniel M. Keck
(74) *Attorney, Agent, or Firm* — DICKINSON WRIGHT PLLC

(57) ABSTRACT

A belt retractor comprising a belt reel rotatably mounted in a frame securable to a vehicle and on which a seatbelt can be wound, and a blocking device arranged on a mechanical side of the belt reel and which blocks the belt reel when a specified seatbelt pull-out acceleration and/or a vehicle deceleration is exceeded, activating the blocking device in the pull-out direction of the seatbelt, and an electric motor for rotating the belt reel, and a gearing mechanism which transmits the rotational movement from the electric motor to the belt reel, wherein the electric motor and gearing mechanism are arranged coaxial to the rotational axis of the belt reel and in series relative to the belt reel; and a transfer rod (Continued)

is provided arranged coaxial to the rotational axis of the belt reel and in series with the belt reel.

10 Claims, 2 Drawing Sheets

(58) Field of Classification Search
USPC .............................. 280/801.1, 806, 807, 808
See application file for complete search history.

(56) References Cited

U.S. PATENT DOCUMENTS

| 2013/0256445 | A1 | 10/2013 | Lucht |
| 2020/0047710 | A1 | 2/2020 | Jabusch et al. |
| 2020/0047711 | A1 | 2/2020 | Jabusch et al. |
| 2021/0387593 | A1 | 12/2021 | Jabusch et al. |

FOREIGN PATENT DOCUMENTS

| DE | 102018213279 | A1 | 2/2020 |
| DE | 102018219040 | A1 | 5/2020 |
| EP | 4065425 | A1 | 10/2022 |
| WO | 03/099619 | A2 | 12/2003 |
| WO | 2021105159 | A1 | 6/2021 |

\* cited by examiner

BELT RETRACTOR

CROSS-REFERENCE TO RELATED APPLICATIONS

This application is a 35 U.S.C. § 371 national phase of PCT International Application No. PCT/EP2021/073824, filed Aug. 30, 2021, which claims the benefit of priority under 35 U.S.C. § 119 to German Patent Application No. 10 2020 211 20, filed Sep. 7, 2020, the contents of which are incorporated herein by reference in its entirety.

FIELD

The present invention relates to a belt retractor having the features of the preamble of claim 1.

BACKGROUND

Belt retractors have as basic components a load-bearing frame and a belt reel that is rotatably mounted in the frame and onto which a safety belt can be wound. The frame serves not only for mounting the belt reel but also for fastening the belt retractor to a seat structure or to a vehicle structure and, for this purpose, is made of a correspondingly thick steel sheet, which is bent into a U-shaped frame. Further, a first blocking device is provided on the belt reel, by means of which the belt reel can be blocked in the pull-out direction when a specified belt pull-out acceleration and/or vehicle deceleration is exceeded. The first blocking device comprises, as a basic component, a first blocking pawl which blocks the belt reel upon activation of the first blocking device relative to the frame. Further, the first blocking device comprises a first control disc which is spring-loaded with respect to the belt reel and rotates with the belt reel, which first control disc has a control contour on which the first blocking pawl rests with a control pin. Furthermore, the first blocking device comprises one or two sensor devices which, when the specified belt strap pull-out acceleration or vehicle deceleration is exceeded, stops the first control disc with respect to the belt reel and thereby forces the blocking movement of the first blocking pawl via the control contour and the control pin resting thereon. The side of the belt reel on which the first blocking device is arranged is referred to as the mechanical side.

Vehicle seats having safety belt devices are known, for example, in the use as front seats in convertibles, in which at least the belt retractors of the safety belt devices are fastened in the backrests of the vehicle seats. In this case, due to the lack of a load-bearing B-pillar and for reasons relating to access to the rear seats or for reasons relating to distance from the rear vehicle structure, the belt retractors are preferably integrated into the backrests of the vehicle seats, which must therefore also be designed to absorb the tensile forces acting in the case of restraint. The belt retractors themselves have all the basic components of a standard belt retractor and are equipped only with various additional subassemblies provided especially for installation in the backrest, such as a self-aligning inertia sensor.

In its basic design, the vehicle seat has a seat structure consisting of several load-bearing structural parts, which serve to fasten the vehicle seat to the vehicle structure. The seat structure is equipped with springs and cushioning in order to improve sitting comfort, and moreover serves for the fastening of further components, such as various seat adjustment mechanisms, including the associated electric motors and further components, such as heating devices, sensors, displays, headrests, and various further attachment parts.

In modern vehicles with autonomous driving systems, there is an increasing demand for greater adjustability of vehicle seats in various orientations and positions in such a manner that the vehicle occupant can use the freedom obtained by autonomous driving, for example, for more meaningful communication with the other occupants, for extended and more intensive rest phases or even for work, and can orient the vehicle seat accordingly. As a result, the safety belt device and in particular the belt retractor no longer have to be fastened to the vehicle structure as heretofore but rather to the vehicle seat, as has already been the case, for example, with the front seats of convertibles.

Further, in modern safety belt devices, belt retractors are provided with electric motors which drive the belt shaft upon activation, for example to reversibly tighten a belt in the winding direction. The electric motor is thereby likewise fastened to the frame and is arranged lateral to the belt shaft, with a drive shaft oriented parallel to the rotational axis of the belt shaft. Further, it is known to provide a gearing mechanism between the belt shaft and the electric motor, via which gearing mechanism the rotational speed of the electric motor is translated into a specified rotational speed of the belt shaft. The use of the gearing mechanism also makes it possible to use an electric motor that is as compact as possible with a high rotational speed. A belt retractor with an increased installation space requirement is thus produced overall, despite the use of the compact electric motor made possible by the gearing mechanism. Such a belt retractor is known, for example, from publication WO 03/0 99 619 A2.

Insofar as the belt reel is to be driven at different rotational speeds and torques, further gear stages must be provided which further increase the installation space requirement. Such a belt retractor is known, for example, from publication DE 199 27 731 C2.

Since the installation spaces available on the seat structure of the vehicle seats or in general in very small vehicles are very limited in their size and cannot be enlarged as desired for design reasons, the arrangement of such a belt retractor on the vehicle seat or even in a small vehicle is fundamentally problematic.

SUMMARY

Against this background, the invention is based on the object of providing a slender belt retractor, with an electric motor and a gearing mechanism, which can be arranged even in very narrow installation spaces.

According to the invention, a belt retractor having the features of Claim 1 is proposed for achieving the object. Further preferred developments of the invention can be taken from the dependent claims, the figures and the associated description.

According to the basic idea of the invention, it is proposed that the electric motor and the gearing mechanism are arranged coaxially with respect to the rotational axis of the belt reel and in series with the belt reel, and a transfer rod is provided which is arranged coaxial to the rotational axis of the belt reel and in series with the belt reel, and a first end of which is rotationally fixed to the belt reel on the mechanical side of the belt reel, and a second end of which is rotationally fixed to a drive gear of the gearing mechanism via a profiled section, said transfer rod extending through the first blocking device.

The transfer rod is rotationally fixed with its first end to the belt reel and extends from the first end outward, coaxial to the rotational axis of the belt reel, and thus in practice forms an axial elongation of the belt reel. The transfer rod is rotationally fixed with its second end to a drive gear of the first gearing mechanism via a profiled section, in such a manner that the belt reel is rotationally fixed to the drive gear of the gearing mechanism via the transfer rod. The transfer rod thereby extends through the first blocking device on the mechanical side of the belt retractor, and thereby enables a narrow coaxial series arrangement of the gearing mechanism with the electric motor to the belt reel on the mechanical side thereof. The first blocking device can thus be arranged in a plane which intersects the transfer rod, and the first blocking device is thus arranged on the circumference of the torsion bar in a compact design. The proposed solution has the further advantage that, due to the connection of its first end to the mechanical side of the belt reel, upon blocking the belt reel via the first blocking device, the transfer rod is directly and completely removed from the force flow of the tensile force exerted across the seat belt, in that the tensile force is introduced directly into the vehicle structure via the first blocking pawl of the first blocking device during the blocking thereof. The transfer rod further enables a connection of the belt reel to the gearing mechanism despite the first blocking device arranged between them.

The first blocking device thereby preferably has a first rotatably mounted control disc, and the transfer rod extends through a central opening of the first control disc. The first control disc serves to control a first blocking pawl of the first blocking device and forms a compact structure with the transfer rod extending through the central opening, with an improved utilization of the free space created by the transfer rod between the gearing mechanism and the belt reel. Further, the transfer rod enables a connection of the belt reel to the gearing mechanism, in particular via the plane in which the first control disc is arranged.

The first control disc can thereby preferably be mounted on the transfer rod in such a manner that, in addition to its actual function of connecting the belt reel to the gearing mechanism, the transfer rod additionally takes over a second function, namely the mounting of the first control disc, in such a manner that a further or previously necessary mounting of the first control disc in a different manner is omitted.

It is further proposed that a second blocking device is provided which, upon activation, blocks a part of the gearing mechanism in a vehicle-fixed manner and thereby shifts the gearing mechanism from a first force transmission path into a second force transmission path, and the second blocking device has a second rotatably mounted control disc, and the transfer rod extends through a central opening of the second control disc. The second blocking device serves for the shifting of the gearing mechanism, and for this purpose has a second control disc which, according to the same principle as the first control disc, upon activation of the second blocking device forces a second blocking pawl into a driven movement into a vehicle-fixed toothing, and thereby blocks the part of the gearing mechanism for shifting the second force transmission path. The second and first control discs thus form a compact assembly together with the transfer rod, wherein the free space bridged by the transfer rod is used in a compact design both for the arrangement of the first control disc and for the arrangement of the second control disc.

The second control disc can thereby preferably likewise be mounted on the transfer rod, which results in the same advantages as given the mounting of the first control disc.

The first and the second control disc are arranged adjacent in parallel and with their rotational axes coaxial to one another. The second control disc is thereby preferably arranged parallel to the first control disc and with its rotational axis coaxial to the rotational axis of the first control disc, in such a manner that the two control discs form a compact assembly with a common rotational axis through which the transfer rod extends.

This parallel arrangement of the two control discs can then be further developed, in terms of its compact design, in that the first and the second control disc can be blocked by a common blocking lever. An otherwise required second blocking lever, and the associated activation mechanism for the second blocking device, can thereby be spared. Via the use of a common blocking lever, the first control disc and the second control disc are thereby always stopped at the same time with respect to the belt reel, or with respect to the gearing mechanism rotating in the first force transmission path upon pre-tightening. However, since the blocking of the first blocking device is only triggered when the first control disc is blocked in the pull-out direction and the belt reel rotates further in the pull-out direction, but given a tightening the belt reel is driven in the retraction direction via the electric motor and the gearing mechanism, the engagement of the common blocking lever in the first control disc does not lead to an activation of the first blocking device upon engaging the gearing mechanism. In the reverse case, the engagement of the common blocking lever in the second control disc is likewise not disadvantageous when the specified values of the belt strap pull-out acceleration and vehicle deceleration are exceeded, since the belt reel is in any event blocked by the activation of the first blocking device in the pull-out direction.

It is further proposed that the belt reel is formed in two parts, with a belt reel body, and a profile head which can be blocked by the first blocking device in a vehicle-fixed manner, and a force limiting device arranged between the belt reel body and the profile head, and a first end of the transfer rod is rotationally fixed to the profile head. The advantage of this arrangement can be seen in that, due to being rotationally fixed to the transfer rod on one side and the force limitation device arranged between the profile head and the belt reel body, the profile head, which can be blocked in a vehicle-fixed manner via the first blocking device, forms a structural interface between the transfer rod and the force limiting device, whereby the transfer rod and the force limiting device are automatically decoupled from one another when the profile head is blocked, since the exerted tensile force are introduced into the vehicle structure via the profile head and the first blocking device.

It is thereby further proposed that the force limiting device comprises at least one torsion rod which is arranged coaxial to the rotational axis of the belt reel, a first end of which is rotationally fixed in a receptacle arranged on the outside of the belt reel body, and a second end of which is rotationally fixed in a receptacle of the profile head. The torsion bar is thus arranged coaxially and in series with the belt reel body, and thus extends the belt reel into an elongate narrow assembly from the belt reel body forming the first part of the belt reel up to the second part of the belt reel formed by the profile head. Since the transfer rod is rotationally fixed to the profile head, and the transfer rod is arranged coaxial to the belt reel and the belt reel body and the torsion bar is arranged coaxial to the belt reel body, the torsion bar is consequently also arranged coaxial to the transfer rod and forms a further elongated narrow assembly in connection with the belt reel.

Furthermore, in this event it is proposed that the transfer rod has a lower deformation strength than the force limiting device. It can thereby be prevented that the force limiting device is first pre-activated upon a tightening of the safety belt, and thereby is still in the initial state at the beginning of a force-limited belt strap extension. Moreover, it can thereby be prevented that the tightening power is reduced by an activation of the force limiting device. Since, via the blocking of the profile head, the transfer rod is automatically taken out of the force flow at the beginning of the force limitation, its lower deformation strength is also not disadvantageous in this regard. The lower deformation strength can thereby be achieved, for example, via the targeted choice of a material with a lower strength.

A particularly preferred solution is that the transfer rod is made of plastic, since the transfer rod can thereby be very simply designed with the desired strength values and can moreover be produced cost-effectively in large-scale production in an injection molding process.

BRIEF DESCRIPTION OF THE DRAWINGS

The invention is explained below using preferred embodiments with reference to the accompanying figures. The following are shown.

DETAILED DESCRIPTION

Figure 1:
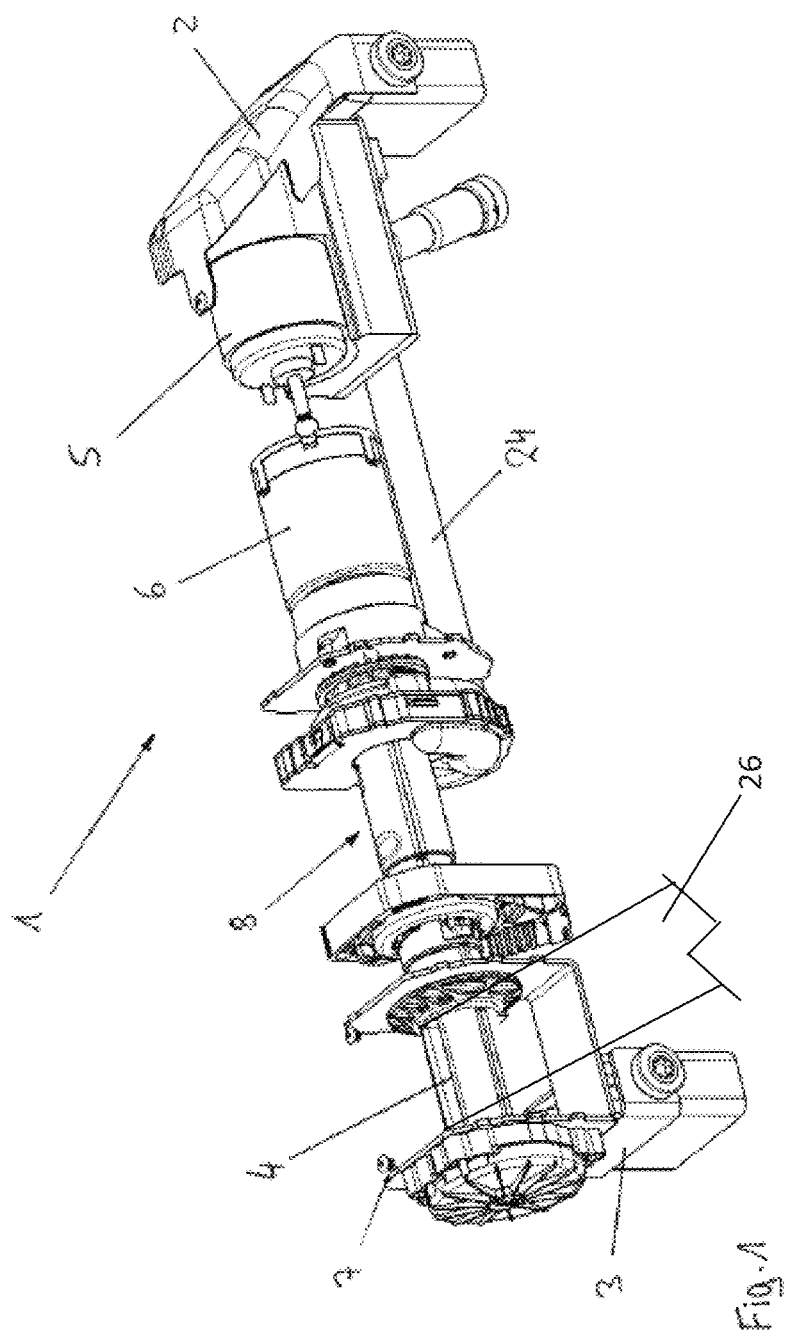
FIG. 1 a belt retractor according to the invention, in an exploded view, and FIG. 2 a belt retractor according to the invention, in a sectional view.

In FIG. 1, a belt retractor 1 according to the invention is visible with two housing halves 2 and 3, shown only in cutouts for the sake of clarity. The complete housing halves 2 and 3 externally encapsulate the belt retractor 1 and additionally serve for fastening the belt retractor 1, for example in a narrow installation space of a vehicle seat. In the belt retractor 1, a belt reel 4 with a force limiting device 8; an electric motor 5; a gearing mechanism 6; and an irreversible pyrotechnic tightening device 24 are provided as basic assemblies.

The belt reel 4 is mounted rotatably in a frame 7, which in turn is fastened to at least one of the housing halves 2 or 3 or is held in a clamped manner between the housing halves 2 and 3, and is thereby supported on the latter in a rotationally fixed manner.

Figure 2:
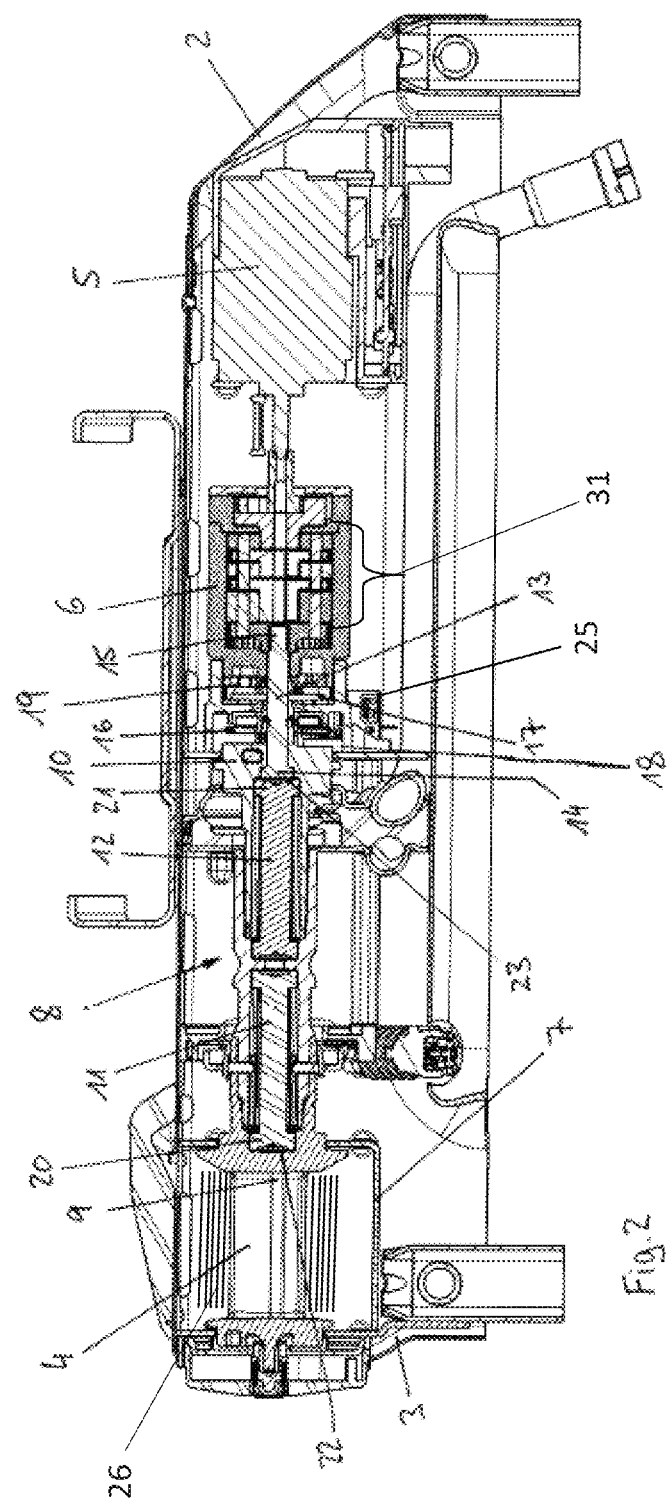

In FIG. 2, the belt retractor in the assembled state is visible in a sectional presentation. The belt reel 4 is formed in two parts, with a belt reel body 9 and a profile head 10 which can be blocked in a vehicle-fixed manner via a first blocking device 18. The belt reel body 9 serves for winding a safety belt 26 (i.e., seat belt), whereas the profile head 10 serves to block the belt reel 4 and, for this purpose, can be blocked in a vehicle-fixed manner via the first blocking device 18 and an associated sensor device when a specified belt pull-out acceleration or vehicle deceleration is exceeded. The belt reel body 9 and the profile head 10 are rotationally fixed to one another via a force limiting device 8, and thus form the belt reel 4 in a rotationally fixed connection up until the activation of the force limiting device 8. The side of the profile head 10 thereby forms the mechanical side of the belt reel 4.

Also visible on the right side of the belt retractor 1 is the electric motor 5, which is supported in a rotationally fixed manner on one or both housing halves 2 and 3. The drive shaft leading out of the electric motor 5 is rotationally fixed to a drive gear 31 of the gearing mechanism 6. A transfer rod 13 is also provided which is rotationally fixed with a first end 14 to the profile head 10, and is rotationally fixed with a second end 15 to the drive gear 31 of the gearing mechanism 6. The belt reel body 9, the force limiting device 8, the profile head 10, the transfer rod 13, the gearing mechanism 6, and finally the electric motor 5 are arranged in series with one another and coaxial to the rotational axis of the belt reel 4, in a narrow elongate arrangement with respect to one another. Furthermore, the force limiting device 8 is formed by two torsion rods 11 and 12 arranged in series, which have different plastic deformation limits and can, for example, be switched by a switching device as described in DE 199 28 427 C2. The force limiting device 8 extends the belt reel body 9 with the coaxial series arrangement of the torsion bars 11 and 12 up until the profile head 10, to form an elongate narrow belt reel 4.

The first blocking device 18 comprises a first blocking pawl pivotably mounted on the profile head 10, and a first control disc 16 with a control contour on which the first blocking pawl rests with a control pin. The gearing mechanism 6 comprises a second blocking device 19 with a pivotably mounted second blocking pawl, and a second control disc 17 with a control contour on which the second blocking pawl rests with a control pin.

To activate the first blocking device 18, the first control disc 16 is stopped relative to the belt reel 4 or relative to the profile head 10, and the first blocking pawl on the profile head 10 is thereupon forced, in a position control movement, into a toothing of the belt retractor 1, said toothing being fixed to the vehicle, whereby the profile head 10 and—given a non-activated force limiting device 8—also the belt reel body 9 are in turn blocked against a further rotation in the pull-out direction of the safety belt 26 wound on the belt reel body 9. In order to stop the first control disc 16, a sensor device in the form of a spring-loaded inertial mass pivotably mounted on the first control disc 16 can be provided, which inertial mass is deflected against the spring force when a specified pull-out acceleration is exceeded and is thereby driven into a toothing fixed to the vehicle, and the first control disc 16 is subsequently held against the belt reel 4 and triggers the blocking movement of the first blocking pawl. A sensor device that is sensitive to the vehicle can also be provided with a blocking lever which is deflected when a specified vehicle deceleration is exceeded and is thereby driven into a toothing of the first control disc 16 and stops the latter in order to trigger the blocking movement of the first blocking pawl with respect to the belt reel 4. The second blocking device 19 is thereby activated in that the second control disc 17 is stopped relative to the gearing mechanism 6, and thereby forces the blocking movement of the second blocking pawl and the shifting of the gearing mechanism 6. Insofar as an electrically controllable sensor device, for example with a blocking lever which can be deflected via an electromagnet, is provided for the vehicle deceleration-sensitive blocking of the first blocking device 16, this electrically controllable sensor device can also be used to block and control the second blocking device 19 in that by the blocking lever is then also used to block the second control disc 17. The first and second control discs 16 and 17 are then blocked via a common blocking lever 25, whereby the compact design of the belt retractor 1 is further improved since the second blocking device 19 does not require a separate control. The second blocking device 19 serves here for the shifting of the gearing mechanism 6, wherein the gearing mechanism 6 is driven as an assembly when the second blocking device 19 is not activated, without a translation of the drive speed of the electric motor 5 taking place. When the second blocking device 19 is activated, the gearing mechanism 6 is shifted in that the housing of the gearing mechanism 6 or another part of the gearing mechanism 6 is blocked in a vehicle-fixed manner, and the rotational movement of the electric motor can be transmitted to the transfer rod 13, and further onto the belt reel 4, only with activation of the gearing mechanism 6 and a rotational movement of the gearwheels of the gearing mechanism 6 with respect to one another with a corresponding transmission ratio of, for example, 1:36 or 1:80.

Due to its rotationally fixed ends 14 and 15, the transfer rod 13 forms a rotationally fixed connection of the belt reel 4 to the drive gear 31 of the gearing mechanism 6. It thereby extends axially from the mechanical side of the belt reel 4—thus from the profile head 10—through the plane in which the first blocking device 18 is arranged with its first control disc 16, and through the second control disc 17 of the second blocking device 19, up to the gearing mechanism 6. The first control disc 16 and the second control disc 17 are thereby preferably mounted on the transfer rod 13 about a respective a central opening and arranged parallel to one another. The transfer rod 13 thus enables a compact structure of the belt retractor 1 with the two blocking devices 18 and 19 in an elongate, narrow design.

The transfer rod 13 transmits the driving rotational movement of the electric motor 5 to the belt reel 4 in the first force transmission path when the gearing mechanism 6 is driven as an assembly in the transmission ratio of 1:1. When the second blocking device 19 is activated, the transfer rod 13 then transmits the rotational movement already translated in the gearing mechanism 6, in the transmission ratio of 1:36 or 1:80, to the belt reel 4. The transfer rod 13 thereby enables the transfer of the rotational movement from the gearing mechanism 6, via the first blocking device 18 and the second blocking device 19, to the belt reel 4 in a compact design. In other words, an intermediate space for the arrangement of the first and second blocking devices 18 and 19 is achieved by the transfer rod 13, in particular with its control discs 16 and 17. In any event, the transfer rod 13 and the two control discs 16 and 17 supplement one another to form a compact design with an optimized utilization of the installation space in the housing of the belt retractor 1. The two control discs 16 and 17 are thereby preferably arranged parallel to one another and arranged perpendicular to the longitudinal axis of the transfer rod 13, in such a manner that a compact design results. Moreover, the two control discs 16 and 17 can thereby additionally be mounted axially on the transfer rod 13 on an axial bearing arranged between them.

The transfer rod 13 preferably has a lower plastic deformation limit than the force limiting level defined by the force limiting device 8, in such a manner that the force limiting device 8 firstly is not unintentionally activated during the tightening of the safety belt 26, or during the execution of a comfort function, and is in practice still in its initial state at the beginning of its activation. Secondly, the driving rotational movement of the electric motor 5 is not thereby unintentionally reduced by a possible activation of the force limiting device, thus the tightening power is not reduced, for example. In the present instance, the use of torsion bars 11 and 12 means that the plastic deformation limit of the transfer rod 13 is deliberately lower than the plastic deformation limits of the torsion bars 11 and 12. This can be realized, for example, in that the transfer rod 13 is made of plastic with a correspondingly lower strengthening than the torsion bars 11 and 12 made from steel. Moreover, plastic is a material which is very favorable and is to be processed in a large-scale production, for example in an injection molding process, and nevertheless has sufficient strength for the transmission of the tightening power and of the rotational movement of the comfort function. Since the transfer rod 13 is connected with its first end 14 to the profile head 10, it is automatically coupled out of the force flow when the first blocking device 18 is activated, and is thereby no longer subsequently loaded. The transfer rod 13 is thereby formed at its second end 15 to form a profiled section, for example in the form of a toothing, with which it is rotationally fixed in a form-fitting receptacle of the drive gear 31 of the gearing mechanism 6. Depending on the distance to be bridged between the profile head 10 or the belt reel 4 and the gearing mechanism 6, a transfer rod 13 of corresponding length can then be used without the gearing mechanism 6, and in particular its drive gear 31, and the belt reel 4 or the profile head 10 needing to be structurally adapted.

While the above description constitutes the preferred embodiment of the present invention, it will be appreciated that the invention is susceptible to modification, variation and change without departing from the proper scope and fair meaning of the accompanying claims.

The invention claimed is:

1. A belt retractor for a vehicle having a seat belt, the belt retractor comprising:
   a belt reel which is rotatably mounted in a housing fixed to the vehicle and onto which the seat belt is wound, and
   a first blocking device which is arranged at a mechanical side of the belt reel and locks the belt reel when a preset belt pull-out acceleration and/or vehicle deceleration is exceeded and an activation in the pull-out direction of the seat belt is thereby triggered, and
   an electric motor for driving the belt reel into a rotational movement, and
   a gearing mechanism transmitting the rotational movement of the electric motor to the belt reel,
   wherein
   the electric motor and the gearing mechanism are arranged coaxially to the axis of rotation of the belt reel and in series with the belt reel,
   a transfer rod arranged coaxially to the axis of rotation of the belt reel and in series with the belt reel is provided that is connected by a first end to the belt reel in a rotationally fixed manner at the mechanical side of the belt reel, and by a second end via a profile head to a drive gear of the gearing mechanism and extends through the first blocking device,
   a force-limiting device arranged between a belt reel body and the profile head, and
   the transfer rod has a lower deformation resistance than the force-limiting device.

2. The belt retractor according to claim 1, wherein
   the first blocking device has a first rotatably mounted control disk, and the transfer rod extends through a central opening in the first rotatably mounted control disk.

3. The belt retractor according to claim 2, wherein the first rotatably mounted control disk is mounted on the transfer rod.

4. The belt retractor according to claim 2, wherein
   the first rotatably mounted control disk and a second rotatably mounted control disk are arranged in parallel next to one another and with their rotational axes coaxial to one another.

5. The belt retractor according to claim 4, wherein the first and the second rotatably mounted control disks can be locked by a common blocking lever.

6. The belt retractor according to claim 1, wherein
a second blocking device is provided which, upon activation, blocks a part of the gearing mechanism in a vehicle-fixed manner and thereby shifts the gearing mechanism from a first force transmission path into a second force transmission path, and
the second blocking device has a second rotatably mounted control disk, and
the transfer rod extends through a central opening in the second rotatably mounted control disk.

7. The belt retractor according to claim 6, wherein the second rotatably mounted control disk is mounted on the transfer rod.

8. The belt retractor according to claim 1, wherein
the belt reel is designed in two parts with the belt reel body and the profile head which can be blocked in a vehicle-fixed manner by the first blocking device, and
the first end of the transfer rod is connected to the profile head in a rotationally fixed manner.

9. The belt retractor according to claim 8, wherein
the force-limiting device comprises at least one torsion bar which is arranged coaxial to the rotational axis of the belt reel and a first end of which is rotationally fixed in a receptacle arranged on an outer face of the belt reel body, and a second end of which is rotationally fixed in a receptacle in the profile head.

10. The belt retractor according to claim 1, wherein the transfer rod is made of plastic.

\* \* \* \* \*